(12) United States Patent
Johnson et al.

(10) Patent No.: US 6,211,641 B1
(45) Date of Patent: Apr. 3, 2001

(54) CAPACITIVE RESOLVER

(75) Inventors: Dan R. Johnson, Los Angeles; Daniel R. Sherman, Redondo Beach; Paul A. Franson, Yorba Linda, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/310,365

(22) Filed: May 12, 1999

(51) Int. Cl.[7] ............................. G05B 1/06; G08C 19/16
(52) U.S. Cl. ..................... 318/660; 318/662; 318/661; 73/118.2; 340/870.37
(58) Field of Search .................................. 318/661–669; 361/298; 324/683, 61 R, 660, 663, 662; 73/118.2, 118.1, 862.34; 340/870.37, 671, 670, 870.25, 686, 347 P, 365 S (56) References Cited

U.S. PATENT DOCUMENTS

| | | | |
|---|---|---|---|
| 3,629,624 | * | 12/1971 | Staudte . |
| 3,668,672 | * | 6/1972 | Parnell . |
| 3,753,067 | * | 8/1973 | Milligan . |
| 4,092,579 | * | 5/1978 | Weit .................................. 318/662 |
| 4,199,800 | * | 4/1980 | Weit .................................. 361/239 |
| 4,358,723 | * | 11/1982 | Scholl et al. .......................... 318/661 |
| 4,404,560 | * | 9/1983 | Williams, Jr. .................... 340/870.37 |
| 4,507,638 | * | 3/1985 | Brosh .................................... 336/79 |
| 4,606,008 | * | 8/1986 | Wason .................................. 364/560 |
| 4,755,731 | * | 7/1988 | Anthony et al. ...................... 318/662 |
| 4,779,094 | * | 10/1988 | Lee et al. ........................ 340/870.37 |
| 4,851,835 | * | 7/1989 | Krumholz et al. ............... 340/870.37 |
| 4,862,752 | * | 9/1989 | Hoyt .................................. 73/863.34 |
| 4,998,103 | * | 3/1991 | Rosswurm et al. ............. 340/870.37 |
| 5,012,237 | * | 4/1991 | Rosswurm ....................... 340/870.37 |
| 5,598,153 | * | 1/1997 | Brasseur et al. ................ 340/870.37 |
| 5,681,990 | * | 10/1997 | Hampo et al. ....................... 73/118.2 |

* cited by examiner

Primary Examiner—Paul Ip
(74) Attorney, Agent, or Firm—Michael S. Yatsko (57) ABSTRACT

The present invention provides a capacitive resolver (100). The capacitive resolver (100) includes a charge plate (102), a sensing plate (106), and an interrupter plate (400) positioned between the charge plate (102) and the sensing plate (106). The front surface of the sensing plate (500) has a sinusoidal pattern (502). The back surface of the sensing plate (600) includes charge detectors (602), charge collectors (608), and rectifiers (618). The capacitive resolver (100) also includes a signal generator (110) which is electrically connected to the charge plate (102) and a signal analyzer which is electrically connected to the sensing plate (106). The capacitive resolver (100) may additionally include a non-conductive support (112).

64 Claims, 6 Drawing Sheets

CAPACITIVE RESOLVER

BACKGROUND OF THE INVENTION

The present invention relates to position sensing devices. In particular, the present invention relates to a capacitive resolver for use as a position sensing device in satellite and terrestrial applications.

In satellite and terrestrial applications, it is often necessary to accurately position different instruments. For example, in satellite applications, accurate positioning of the satellite payload (e.g. telescopes, antennas, or other instruments) is essential. These instruments can be positioned by mounting them on a gimbal which includes a rotatable shaft. In order to accurately position these instruments, the rotational position of the shaft must be determined, and this can be accomplished by using a rotational position sensor.

Rotational position sensors provide position data to the motors which move the gimbal and the shaft. Typically, a rotational position sensor measures the position of the instrument, and this measurement is used to produce a motor commutation signal. The motors then use the motor commutation signal to determine the torque required to move the shaft in the desired direction.

Motor commutation is best accomplished using the output of two sinusoids in quadrature (i.e. two sinusoids separated in phase by 90 degrees). In position sensing applications, it is important to precisely determine position. However, this task is complicated with a sinusoidal output because there are two points on the sine curve that correspond to a given voltage. The addition of a cosine wave, which is 90 degrees out of phase from a sine wave, resolves this ambiguity and allows the position to be determined. For motor commutation, therefore, it is desirable to generate both a sine wave and a cosine wave and then to measure both of the corresponding voltages to unambiguously determine the rotational position of the shaft.

Capacitive sensors, which consist of parallel conducting plates, use changes in capacitance to measure changes in position. Capacitive sensors are often used as rotational position sensors due to their light weight and low cost. However, previous capacitive sensors were not capable of producing output of two sinusoids in quadrature, which is the preferred output for motor commutation.

Additionally, although some previously available rotational position sensors (such as inductive resolvers, wire-wound resolvers, and optical encoders) were capable of producing output of two sinusoids in quadrature, these devices were complex, heavy, and expensive. These types of rotational position sensors also tended to have difficulties with connecting wires becoming tangled around the rotating shaft, although the wire-wound resolver avoided this problem at the cost of added complexity. Finally, if a different motor speed was required for a particular application, it was difficult and expensive to mechanically retool these types of rotational position sensors.

A need has thus long existed in the industry for a lightweight, inexpensive capacitive resolver that allows the output of two sinusoids in quadrature, with flexibility in a number of output speeds.

BRIEF SUMMARY OF THE INVENTION

It is an object of the present invention to provide a capacitive resolver that allows the output of two sinusoids in quadrature.

It is a further object of the present invention to provide a simple, light weight, low cost rotational position sensing device that allows the output of two sinusoids in quadrature.

It is yet a further object of the present invention to provide a simple rotational position sensing device in which connecting wires do not become tangled around the rotating shaft.

It is yet another object of the present invention to provide a rotational position sensing device which allows the motor speed to be easily and inexpensively adjusted.

One or more of the foregoing objects is met, either in whole or in part, by a capacitive resolver. The capacitive resolver includes a charge plate, a sensing plate which has a sinusoidal pattern and an interrupter plate which has a number of apertures. The interrupter plate is positioned between the charge plate and the sensing plate. The capacitive resolver also includes an excitation signal which is electrically connected to the charge plate and a signal conditioner which is electrically connected to the sensing plate.

Also included is a method for sensing the position of a first member relative to a second member which has a sinusoidal pattern of conductors. The method includes the step of generating a fluctuating signal. The first member is then moved in order to couple at least a portion of the fluctuating signal to a portion of the sinusoidal pattern determined by the relative positions of the first member and second member. The method also includes the step of generating a sensing signal in response to the receipt of the coupled signal by the sinusoidal pattern. The position of the first member relative to the second member may then be derived from the sensing signal.

DETAILED DESCRIPTION OF THE INVENTION

Figure 1:
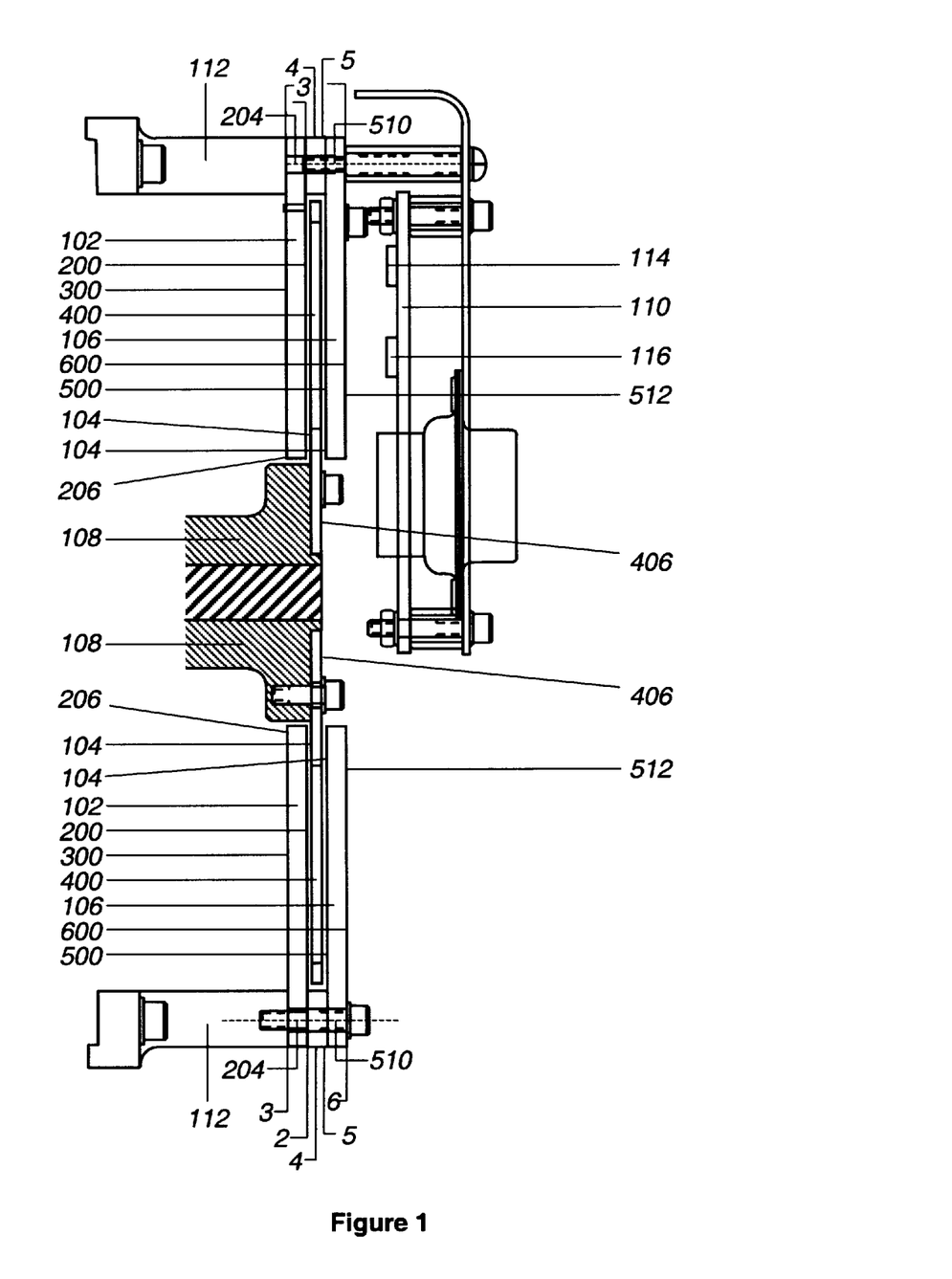
FIG. 1 is a fragmentary, cross-sectional view of a preferred form of the capacitive resolver 100 taken along line 1—1 of FIG. 2.

Turning now to FIG. 1, that figure illustrates a preferred embodiment of a capacitive resolver 100. The capacitive resolver 100 consists of a charge plate 102, an interrupter plate 400, and a sensing plate 106 separated by air gaps 104. The charge plate 102, which may be considered to be a conducting means, comprises a front surface of the charge plate 200, a back surface of the charge plate 300, a central aperture 206, and mounting holes 204. Similarly, the sensing plate 106, which may be considered to be a sensing means, comprises a front surface of the sensing plate 500, a back surface of the sensing plate 600, a central aperture 512, and mounting holes 510. The interrupter plate 400 also has a central aperture 406. Also shown is a shaft 108 (which may be considered a moving means), a non-conductive support 112 and a controller 110 which comprises a signal generator 114 and a signal analyzer 116.

As shown in FIG. 1, the interrupter plate 400 is positioned between the front surface of the charge plate 200 and the front surface of the sensing plate 500. The charge plate 102 and the sensing plate 106 remain stationary and may therefore be connected to the non-conductive support 112 by using mounting holes such as mounting holes 204 and mounting holes 510, respectively.

The interrupter plate 400 is attached to the shaft 108 and is allowed to move. As the shaft 108 rotates, the interrupter plate 400 turns. When a current is applied to the front surface of the charge plate 200 by the signal generator 114, charge passes through the interrupter plate 400, striking the front surface of the sensing plate 500. As the rotational position of the shaft 108 changes, the capacitance of the capacitive resolver 100 changes, and the change in capacitance can be used to measure rotational position.

Although the charge plate 102, the sensing plate 106, and the interrupter plate 400 will typically have the same diameter, the value for this diameter may vary. Typical values for the diameter may range from about 3 inches to about 9 inches, although other values may also be used.

The charge plate 102 and the sensing plate 106 are preferably composed of printed wiring board, such as a G-10 epoxy board. The printed wiring board may be plated onto a ceramic or metal substrate, such as aluminum or beryllium in order to provide greater stability. Additionally, if higher performance characteristics are desired, other materials (such as zerodur, for example) may be used as well. The interrupter plate 400 is preferably constructed of a low cost, lightweight metal such as aluminum, titanium, or beryllium, although other materials can also be used.

The non-conductive support 112 will preferably be made from a non-conducting material. In space applications, for example, Delrin or other types of space-compatible plastic may be used. In terrestrial applications, any stable insulating material, such as ceramic or zerodur, would be appropriate.

Figure 2:
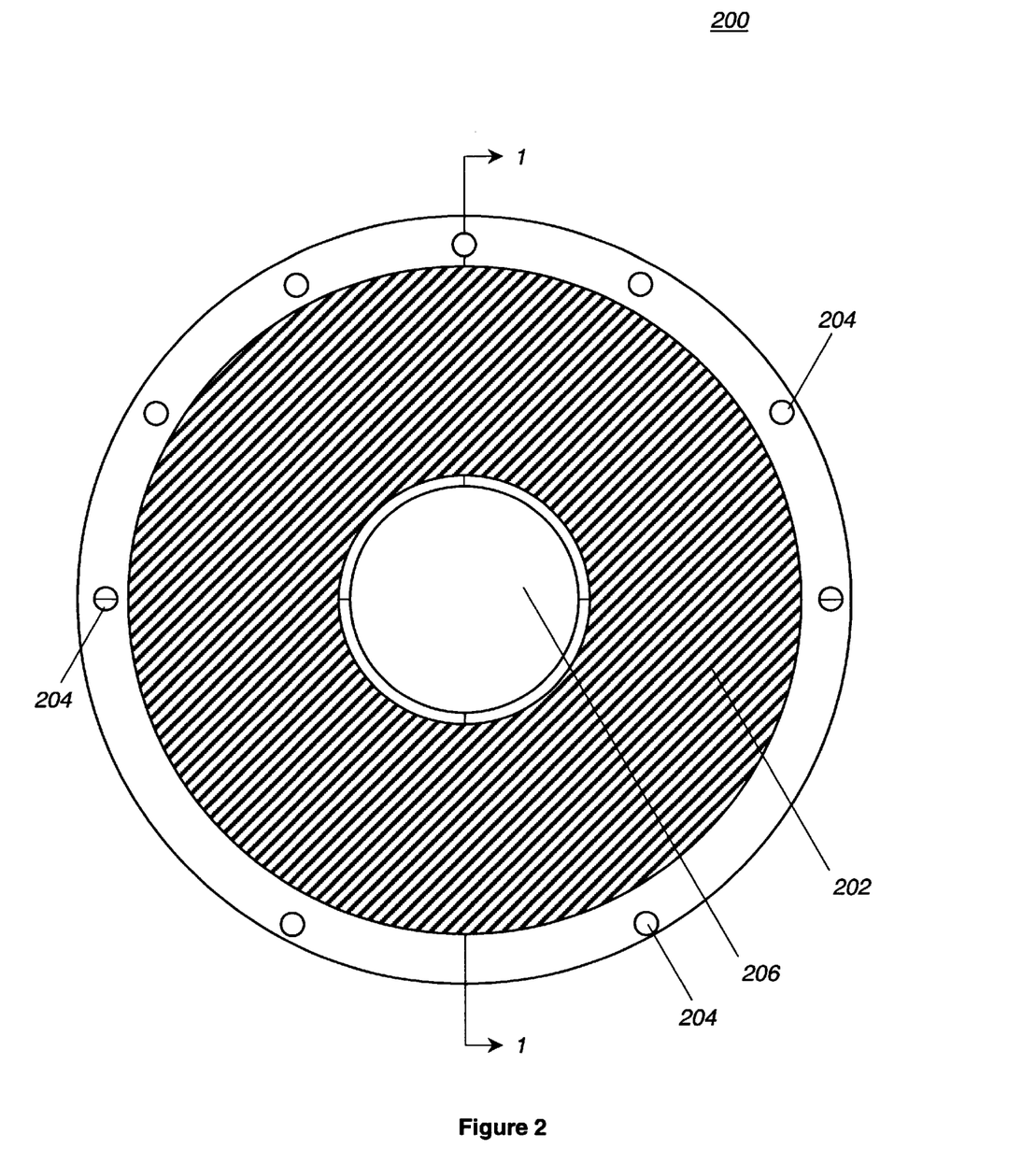
FIG. 2 depicts the front surface of the charge plate 200 taken along line 2—2 of FIG. 1.

Turning to FIG. 2, that figure illustrates the front surface of the charge plate 200. The front surface of the charge plate 200 includes a charged surface 202, mounting holes 204, and a central aperture 206.

Figure 3:
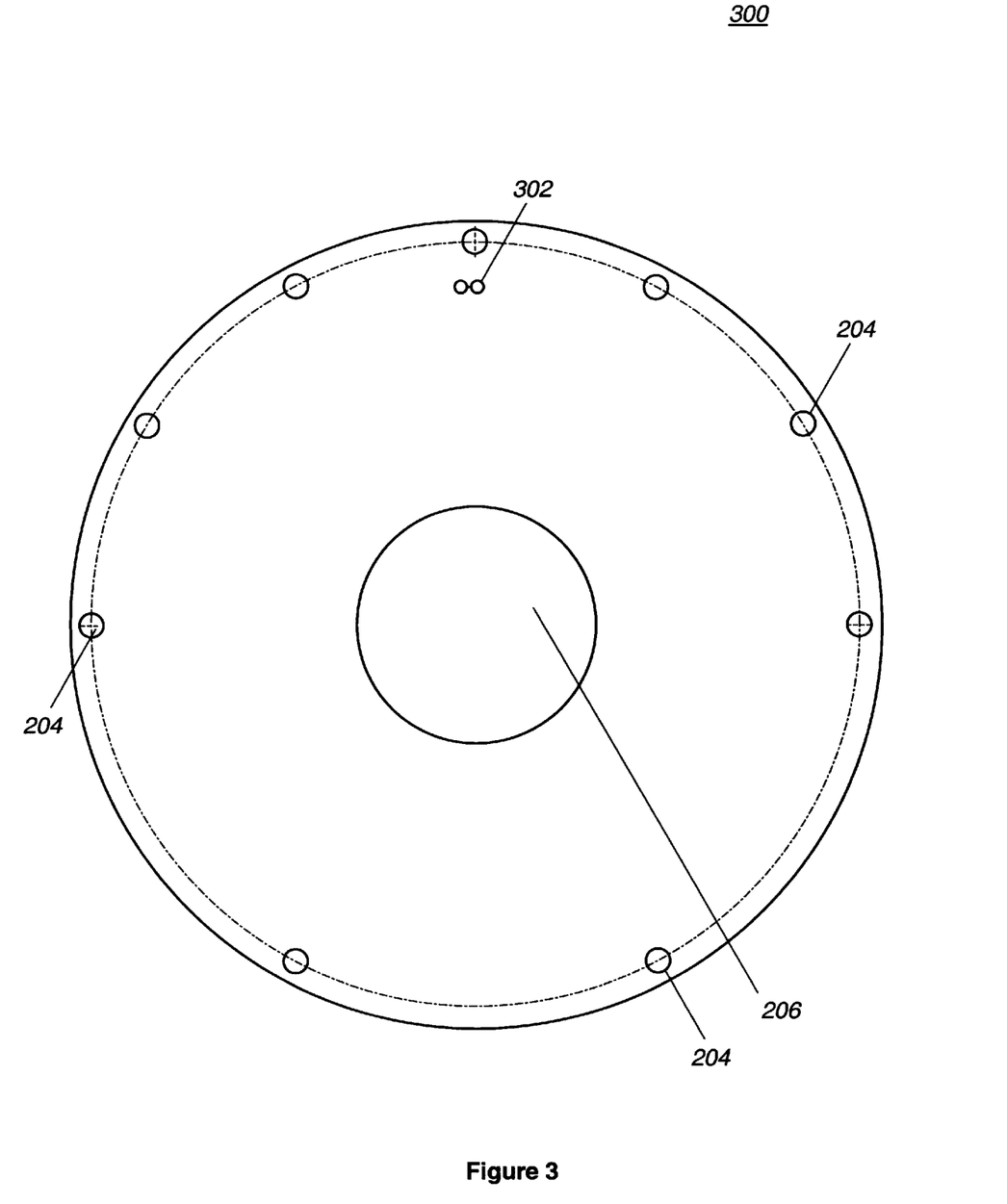
FIG. 3 illustrates the back surface of the charge plate 300 taken along line 3—3 of FIG. 1.

Turning to FIG. 3, that figure illustrates the back surface of the charge plate 300. The back surface of the charge plate 300 includes an input voltage pad 302, mounting holes such as mounting holes 204, and a central aperture 206.

The controller 110 has two basic functions: (1) it generates the excitation signal which is applied to the charge plate 102, and (2) it receives the position signal from the sensing plate 106. The controller 110, which may be an electronics board, includes a signal generator 114 and a signal analyzer 116. The signal generator 114 is electrically connected to the charge plate 102. For example, the electrical connection may be made by connecting the input voltage pad 302 (which will preferably be a plated-through hole) and the signal generator 114 through a soldered wire.

The signal generator 114 generates the excitation signal which is applied to the charge plate 102. Typically, an outside power source would be used to generate a DC voltage which would then be supplied to the signal generator 114. The signal generator 114 would use this DC voltage to generate an AC excitation signal. The excitation signal would then be supplied to the charge plate 102 in order to produce the charged surface 202. It is desirable to apply a higher voltage to the charge plate 102 so that the excitation signal will be at the desired frequency. For example, a 15 Volt input may be used to generate a high frequency excitation signal in the range of one to two megahertz. The charge applied to the charge plate 102 varies sinusoidally with time, thereby causing the capacitive resolver to charge and discharge. The charge-discharge coupling between the charge plate 102 and the sensing plate 106 can then be used to determine the rotational position of the shaft. It should be noted that the foregoing structure may also be considered to be a means for generating a fluctuating signal, such as an AC signal, for example.

The signal analyzer 116 receives the position signal from the sensing plate 106. When the position signal is received, the signal analyzer 116 may amplify the signal. The signal analyzer 116 may then supply the amplified signal to a motor for direct motor commutation.

Figure 4:
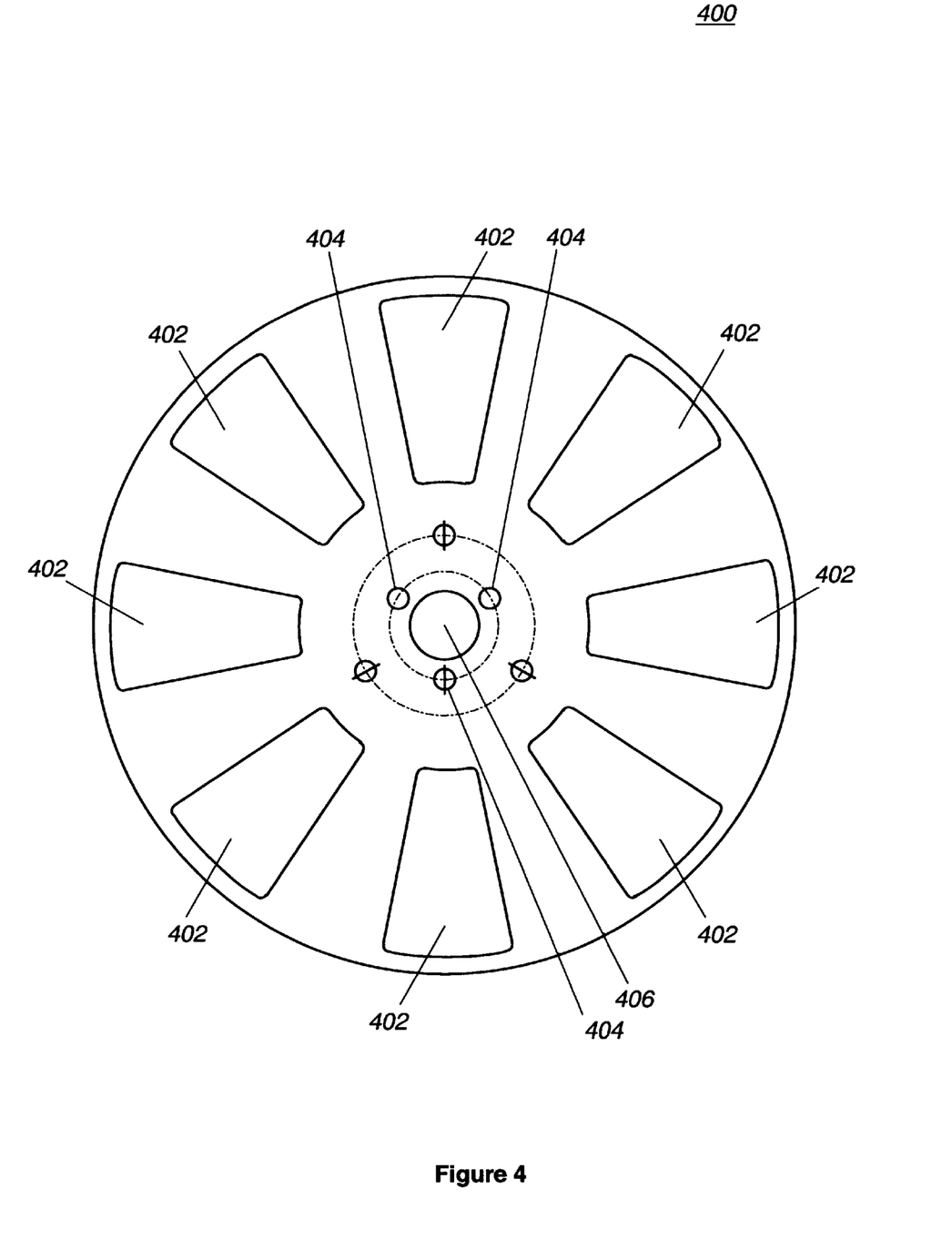
FIG. 4 depicts the front surface of the interrupter plate 400 taken along line 4—4 of FIG. 1.

Turning to FIG. 4, that figure illustrates an interrupter plate 400. The interrupter plate 400 includes a series of apertures 402 and a series of mounting holes 404, which are used to mount the interrupter plate 400 onto the shaft 108. Also shown is a central aperture 406.

As was discussed above, the interrupter plate 400 is preferably constructed of a low cost, lightweight metal such as aluminum, titanium, or beryllium, although other materials can also be used.

It should be noted that the interrupter plate may be considered to be a coupling means for coupling a fluctuating signal.

Figure 5:
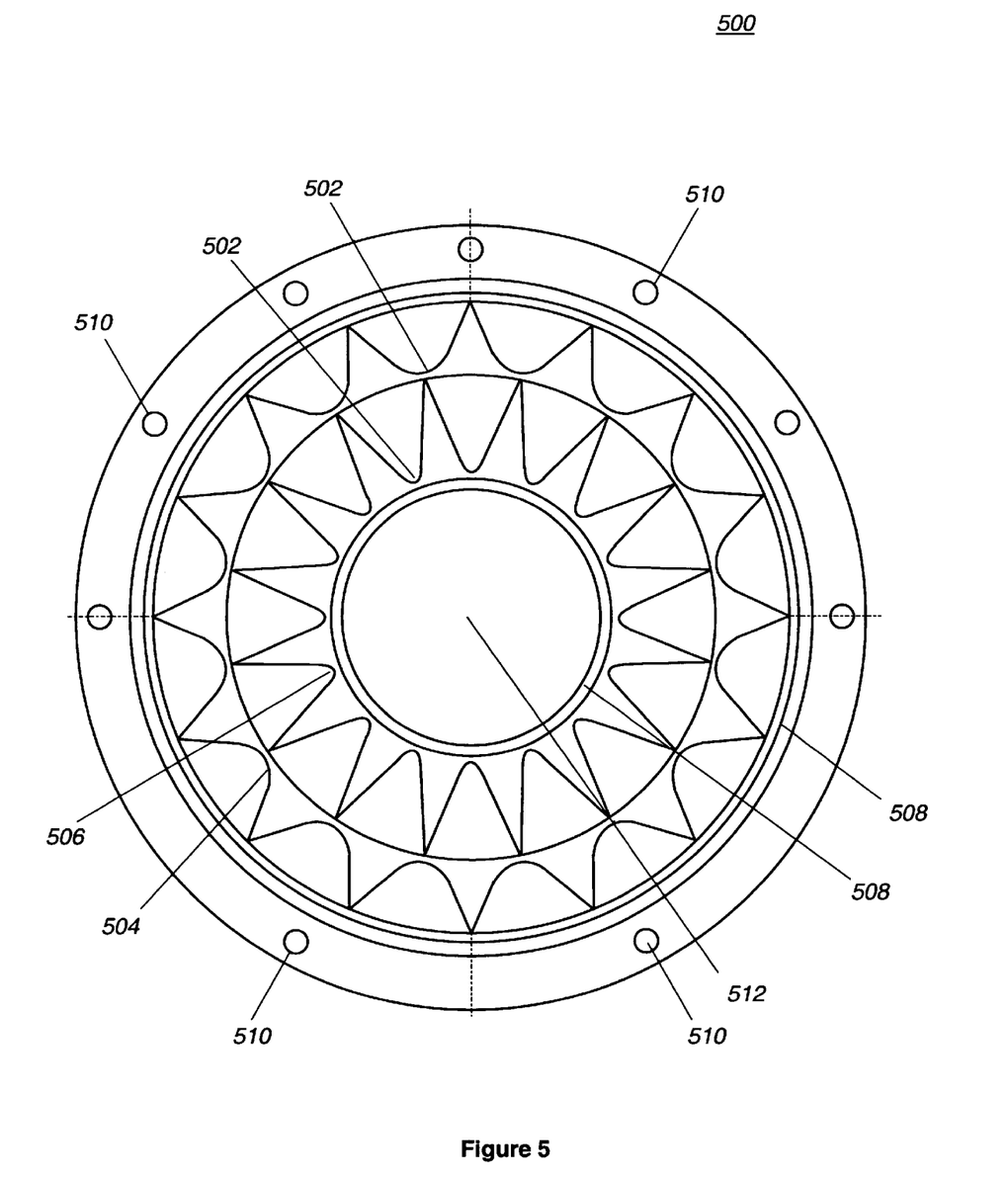
FIG. 5 illustrates a diagram of the front surface of the sensing plate 500 taken along line 5—5 of FIG. 1.

Turning to FIG. 5, that figure illustrates the front surface of the sensing plate 500. The front surface of the sensing plate 500 consists of a sinusoidal pattern 502, which may be composed of a sine pattern 504 and a cosine pattern 506. The front surface of the sensing plate 500 also includes isolator rings 508 and a central aperture 512. Mounting holes 510 (which may be used to mount the sensing plate 106 to a non-conductive support 112) are also shown.

As illustrated in FIG. 5, the sine pattern 504 and the cosine pattern 506 may be composed of a series of electrically independent adjacent arcs. The arcs represent both the positive portion of the sinusoid and the negative portion of the sinusoid. The positive portion of the sinusoid is "flipped over" in order to maximize the surface area which is exposed to the charge. The sine pattern 504 may therefore be considered to be composed of a positive sine pattern and a negative sine pattern. For example, the sine pattern 504 shown in FIG. 5 is composed of 16 arcs. The odd-numbered arcs in the sine pattern may represent the positive portion of the sine pattern and even-numbered arcs in the sine pattern may represent the negative portion of the sine pattern.

Similarly, the cosine pattern 506 is composed of a positive cosine pattern and a negative cosine pattern. As with respect to the sine pattern 504 above, odd-numbered arcs in the cosine pattern may represent the positive portion of the cosine pattern and even-numbered arcs in the cosine pattern may represent the negative portion of the cosine pattern.

As was explained above, the sensing plate 106 is preferably composed of printed wiring board, such as G-10 epoxy board. The sinusoidal pattern 502 is preferably composed of a layer of copper which has been photoprinted and etched onto the surface of the printed wiring board using standard manufacturing techniques. Other materials may be also be used to construct the sensing plate 106 when a greater degree of accuracy is required. For example, copper plated on a ceramic substrate or on zerodur may also be used.

The isolator rings 508 may be used to electrically isolate the front surface of the sensing plate 500. The isolator rings 508 prevent the charge from leaking over to the surrounding components of the capacitive resolver, and they may be grounded or non-grounded depending on the desired performance characteristics. The isolator rings 508 may be, for example, Kelvin rings.

Figure 6:
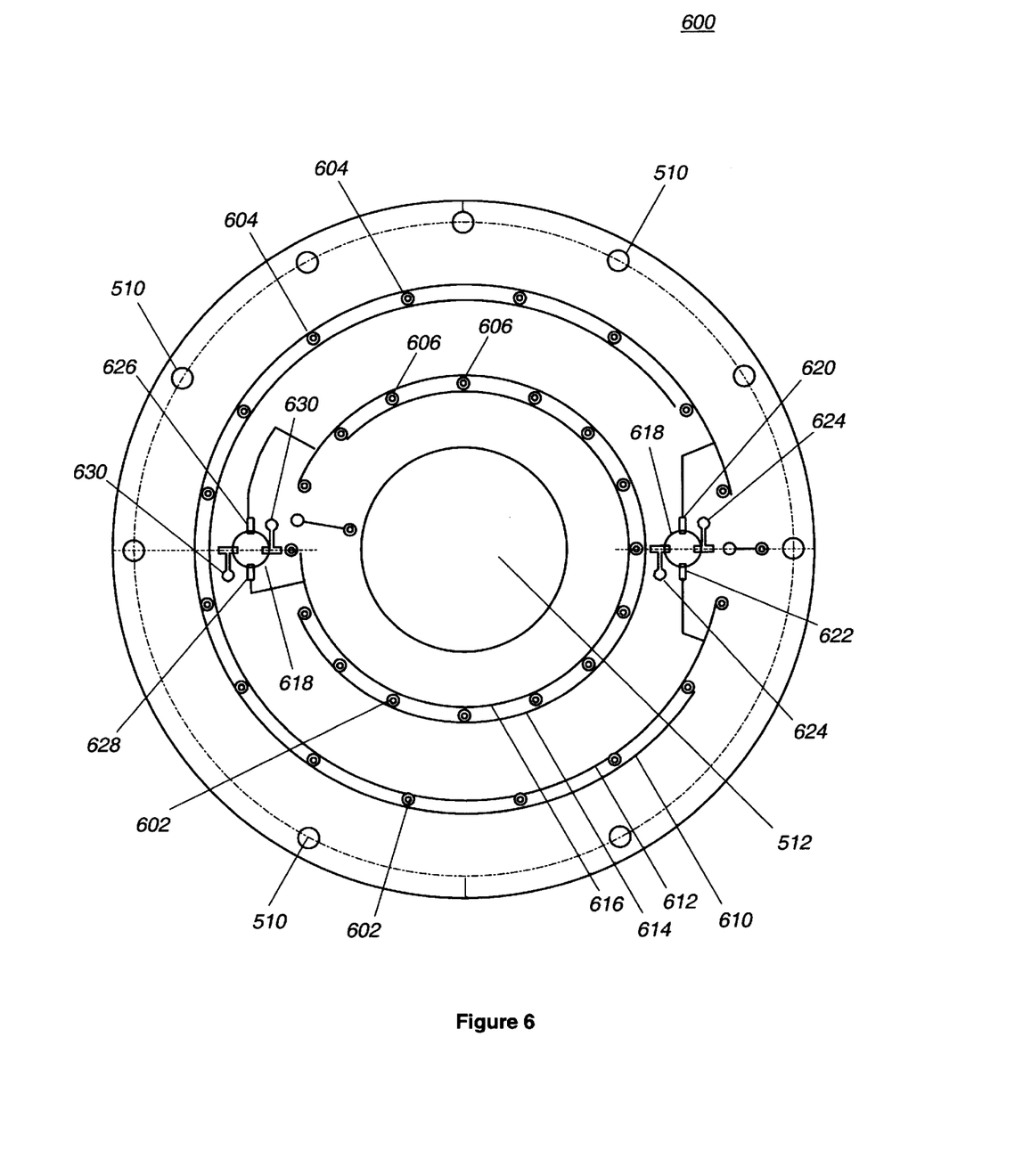
FIG. 6 is a diagram of the back surface of the sensing plate 600 taken along line 6—6 of FIG. 1.

Turning to FIG. 6, that figure illustrates the back surface of the sensing plate 600. The back surface of the sensing plate 600 consists of charge detectors 602 (including sine detectors 604 and cosine detectors 606), charge collectors 608 (including a positive sine collector 610, a negative sine collector 612, a positive cosine collector 614, and a negative cosine collector 616), and rectifiers 618.

The back surface of the sensing plate 600 further comprises a positive sine voltage pad 620, a negative sine voltage pad 622, sine output pads 624, a positive cosine voltage pad 626, a negative cosine voltage pad 628, and cosine output pads 630. Also shown are mounting holes 510 and a central aperture 512.

As was explained above, the interrupter plate 400 is positioned between the front surface of the charge plate 200 and the front surface of the sensing plate 500. The interrupter plate 400 is attached to the shaft 108. As the shaft 108 rotates, the interrupter plate 400 turns. When charge is applied to the front surface of the charge plate 200, the apertures 402 on the interrupter plate 400 allow the charge to pass through the interrupter plate 400 and strike the sinusoidal pattern 502 on the front surface of the sensing plate 500. As the interrupter plate 400 exposes the sinusoidal pattern 502, the charge "seen" by the sinusoidal pattern 502 is summed together by the charge detectors 608 on the back surface of the sensing plate 600. In this way, the charge detectors 608 measure the charge, and therefore the capacitance, of the device.

As was explained above, both the sine pattern 504 and the cosine pattern 506 may be composed of a series of electrically independent adjacent arcs. Each of these electrically independent arcs has a corresponding charge detector on the back surface of the sensing plate 600. The charge detectors 602 detect the charge which is present on the arcs. The charge detectors 602 are electrically connected to charge collectors 608 which collect the corresponding voltages. For example, the positive sine collector 610 electrically connects the positive sine detectors, and the negative sine collector 612 electrically connects the negative sine detectors. Similarly, the positive cosine detectors and negative cosine detectors are connected respectively by the positive cosine collector 614 and negative cosine collector 616.

Preferably, the charge detectors 602 are plated-through holes and the charge detectors 608 are circuit traces; standard printed wiring board techniques may be used to manufacture these components.

A rectifier 618, such as a diode ring, may be used to convert the AC position signal into a DC voltage. The rectifier 618 essentially adds the signals from the positive and negative sine collectors, and converts this signal into a DC voltage which is proportional to the sine of the angle of rotation of the shaft 108. For example, a rectifier 618 may be electrically connected to the positive sine voltage pad 620, the negative sine voltage pad 622, and the sine output pads 624. Similarly, a rectifier 618 may be electrically connected to the positive cosine voltage pad 626, the negative cosine voltage pad 628, and the cosine output pads 630.

In order to determine the rotational position of the shaft 108, the output of both the sine pattern 504 and the cosine pattern 506 is required. As was explained above, the use of both the sine pattern 504 and the cosine pattern 506 allows the output of two sinusoids in quadrature which resolves the ambiguity inherent in using a sinusoidally varying output.

Both the sinusoidal pattern on the sensing plate 106 and the number of apertures 402 on the interrupter plate 400 can be easily modified to accommodate motors of differing speeds. For example, the device as shown is an eight-speed device, i.e. it provides eight sinusoids when the device is rotated through 360 degrees. For direct motor commutation, it is important to have the same number of motor speeds as there are motor poles because the amplified sinusoidal output from the position sensor is directly supplied to the motor. The number of motor poles (i.e. the number of sinusoids required to drive the motor) can be customized by modifying the number of apertures 402 on the interrupter plate 400 and the sinusoidal pattern 502 on the sensing plate 106.

It should be noted that the capacitive resolver shown is an incremental position sensor as opposed to an absolute position sensor. In other words, as the interrupter plate 400 rotates, it exposes the exact same sinusoidal pattern every 45 degrees (the pattern may be repeated at different intervals for different speed devices) so that there are multiple shaft positions which will result in the same output from the capacitive resolver. Incremental position sensors use a counter in order to determine the exact rotational position of the shaft. The counter is incremented every time the interrupter plate 400 moves through one complete sinusoidal pattern (i.e. a positive sine pattern and a negative sine pattern).

The present invention provides a simple, light weight, low cost rotational position sensing device that allows the output of two sinusoids in quadrature. Because both the sinusoidal pattern on the sensing plate and the number of apertures on the interrupter plate can be easily modified, this device allows the motor speed to be easily and inexpensively adjusted for direct motor commutation. Furthermore, the interrupter plate is the only portion of the device that rotates so the connecting wires do not become tangled around the rotating shaft.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. A capacitive resolver comprising:
    (a) a charge plate, said charge plate comprising a first front surface and a first back surface, said first front surface being electrically charged;
    (b) a sensing plate, said sensing plate comprising a second front surface and a second back surface, said second front surface having a sinusoidal pattern;
    (c) an interrupter plate, said interrupter plate comprising a third front surface, a third back surface, and a plurality of apertures, said interrupter plate disposed between said charge plate and said sensing plate;
    (d) a signal generator electrically connected to said charge plate; and
    (e) a signal analyzer electrically connected to said sensing plate.

2. The capacitive resolver of claim 1 wherein:
    (a) said first front surface is disposed parallel to said third front surface; and
    (b) said second front surface is disposed parallel to said third back surface.

3. The capacitive resolver of claim 1 further comprising a non-conductive support.

4. The capacitive resolver of claim 1 wherein said second back surface further comprises a plurality of charge detectors.

5. The capacitive resolver of claim 4 wherein said second back surface further comprises at least one charge collector electrically connected to said charge detectors.

6. The capacitive resolver of claim 5 wherein said second back surface further comprises at least one rectifier electrically connected to said charge collector.

7. The capacitive resolver of claim 6 wherein said rectifier is electrically connected to said signal analyzer.

8. The capacitive resolver of claim 5 wherein said sinusoidal pattern comprises a sine pattern and a cosine pattern.

9. The capacitive resolver of claim 8 wherein said sine pattern is comprised of a plurality of adjacent arcs.

10. The capacitive resolver of claim 8 wherein said cosine pattern is comprised of a plurality of adjacent arcs.

11. The capacitive resolver of claim 8 wherein said sinusoidal pattern further comprises a positive sine pattern, a negative sine pattern, a positive cosine pattern, and a negative cosine pattern.

12. The capacitive resolver of claim 11 wherein said plurality of charge detectors further comprises a plurality of positive sine detectors, a plurality of negative sine detectors, a plurality of positive cosine detectors, and a plurality of negative cosine detectors.

13. The capacitive resolver of claim 12 wherein said positive sine pattern is connected to said plurality of positive sine detectors.

14. The capacitive resolver of claim 13 wherein said plurality of positive sine detectors is connected to said first charge collector.

15. The capacitive resolver of claim 12 wherein said negative sine pattern is connected to said plurality of negative sine detectors.

16. The capacitive resolver of claim 15 wherein said plurality of negative sine detectors is connected to said second charge collector.

17. The capacitive resolver of claim 12 wherein said positive cosine pattern is connected to said plurality of positive cosine detectors.

18. The capacitive resolver of claim 17 wherein said plurality of positive cosine detectors is connected to said third charge collector.

19. The capacitive resolver of claim 12 wherein said negative cosine pattern is connected to said plurality of negative cosine detectors.

20. The capacitive resolver of claim 19 wherein said plurality of negative cosine detectors is connected to said fourth charge collector.

21. The capacitive resolver of claim 12 further comprising a first charge collector, a second charge collector, a third charge collector, and a fourth charge collector.

22. The capacitive resolver of claim 1 wherein said sinusoidal pattern is electrically isolated on said sensing plate.

23. A capacitive resolver comprising:
(a) a charge plate, said charge plate comprising a first front surface and a first back surface, said first front surface being electrically charged;
(b) a sensing plate, said sensing plate comprising a second front surface and a second back surface, said second front surface having a positive sine pattern, a negative sine pattern, a positive cosine pattern, and a negative cosine pattern, and said second back surface comprising a plurality of positive sine detectors connected to said positive sine pattern, a plurality of negative sine detectors connected to said negative sine pattern, a plurality of positive cosine detectors connected to said positive cosine pattern, a plurality of negative cosine detectors connected to said negative cosine pattern, a first charge collector connected to said positive sine detectors, a second charge collector connected to said negative sine detectors, a third charge collector connected to said positive cosine detectors, a fourth charge collector connected to said negative cosine detectors, and at least one rectifier electrically connected to said charge collectors;
(c) an interrupter plate, said interrupter plate comprising a third front surface disposed parallel to said first front surface, a third back surface disposed parallel to said second front surface, and a plurality of apertures, said interrupter plate disposed between said charge plate and said sensing plate;
(d) a signal generator electrically connected to said charge plate;
(e) a signal analyzer electrically connected to said sensing plate; and
(f) a non-conductive support.

24. A position sensor comprising a shaft and a capacitive resolver, said capacitive resolver comprising:
(a) a charge plate, said charge plate comprising a first front surface and a first back surface, said first front surface being electrically charged;
(b) a sensing plate, said sensing plate comprising a second front surface and a second back surface, said second front surface having a sinusoidal pattern;
(c) an interrupter plate, said interrupter plate comprising a third front surface, a third back surface, and a plurality of apertures, said interrupter plate disposed between said charge plate and said sensing plate, said interrupter plate connected to said shaft;
(d) a signal generator electrically connected to said charge plate; and
(e) a signal analyzer electrically connected to said sensing plate.

25. The position sensor of claim 24 wherein:
(a) said first front surface is disposed parallel to said third front surface; and
(b) said second front surface is disposed parallel to said third back surface.

26. The position sensor of claim 24 further comprising a non-conductive support.

27. The position sensor of claim 24 wherein said second back surface further comprises a plurality of charge detectors.

28. The position sensor of claim 27 wherein said second back surface further comprises at least one charge collector electrically connected to said charge detectors.

29. The position sensor of claim 28 wherein said second back surface further comprises at least one rectifier electrically connected to said charge collector.

30. The position sensor of claim 29 wherein said rectifier is electrically connected to said signal analyzer.

31. The position sensor of claim 28 wherein said sinusoidal pattern comprises a sine pattern and a cosine pattern.

32. The position sensor of claim 31 wherein said sine pattern is comprised of a plurality of adjacent arcs.

33. The position sensor of claim 31 wherein said cosine pattern is comprised of a plurality of adjacent arcs.

34. The position sensor of claim 31 wherein said sinusoidal pattern further comprises a positive sine pattern, a negative sine pattern, a positive cosine pattern, and a negative cosine pattern.

35. The position sensor of claim 34 wherein said plurality of charge detectors further comprises a plurality of positive sine detectors, a plurality of negative sine detectors, a plurality of positive cosine detectors, and a plurality of negative cosine detectors.

36. The position sensor of claim 35 wherein said positive sine pattern is connected to said plurality of positive sine detectors.

37. The position sensor of claim 36 wherein said plurality of positive sine detectors is connected to said first charge collector.

38. The position sensor of claim 35 wherein said negative sine pattern is connected to said plurality of negative sine detectors.

39. The position sensor of claim 38 wherein said plurality of negative sine detectors is connected to said second charge collector.

40. The position sensor of claim 35 wherein said positive cosine pattern is connected to said plurality of positive cosine detectors.

41. The position sensor of claim 40 wherein said plurality of positive cosine detectors is connected to said third charge collector.

42. The position sensor of claim 35 wherein said negative cosine pattern is connected to said plurality of negative cosine detectors.

43. The position sensor of claim 42 wherein said plurality of negative cosine detectors is connected to said fourth charge collector.

44. The position sensor of claim 35 further comprising a first charge collector, a second charge collector, a third charge collector, and a fourth charge collector.

45. The position sensor of claim 24 wherein said sinusoidal pattern is electrically isolated on said sensing plate.

46. A position sensor comprising a shaft and a capacitive resolver, said capacitive resolver comprising:
   (a) a charge plate, said charge plate comprising a first front surface and a first back surface, said first front surface being electrically charged;
   (b) a sensing plate, said sensing plate comprising a second front surface and a second back surface, said second front surface having a positive sine pattern, a negative sine pattern, a positive cosine pattern, and a negative cosine pattern, and said second back surface comprising a plurality of positive sine detectors connected to said positive sine pattern, a plurality of negative sine detectors connected to said negative sine pattern, a plurality of positive cosine detectors connected to said positive cosine pattern, a plurality of negative cosine detectors connected to said negative cosine pattern, a first charge collector connected to said positive sine detectors, a second charge collector connected to said negative sine detectors, a third charge collector connected to said positive cosine detectors, a fourth charge collector connected to said negative cosine detectors, and at least one rectifier electrically connected to said charge collectors;
   (c) an interrupter plate, said interrupter plate comprising a third front surface disposed parallel to said first front surface, a third back surface disposed parallel to said second front surface, and a plurality of apertures, said interrupter plate disposed between said charge plate and said sensing plate;
   (d) a signal generator electrically connected to said charge plate;
   (e) a signal analyzer electrically connected to said sensing plate; and
   (f) a non-conductive support.

47. A position sensor comprising:
   (a) generating means for generating a fluctuating signal;
   (b) sensing means defining a sinusoidal pattern for generating a sensing signal in response to receipt of at least a portion of said fluctuating signal;
   (c) conducting means for conducting said fluctuating signal from said generating means to a position aligned with said sinusoidal pattern;
   (d) coupling means for coupling at least a portion of said fluctuating signal from said conducting means to portions of said sinusoidal pattern depending on the position of said coupling means relative to said sinusoidal pattern, said coupling means comprising a surface interrupted by a plurality of apertures; and
   (e) moving means for moving said coupling means relative to said sensing means whereby the position of said coupling means relative to said sensing means can be determined from said sensing signal.

48. The position sensor of claim 47 wherein said fluctuating signal is an AC signal.

49. The position sensor of claim 48 wherein said AC signal has a frequency of between about 1 megahertz and about 2 megahertz.

50. The position sensor of claim 47 wherein said sinusoidal pattern comprises a metal surface aligned with said conducting means.

51. The position sensor of claim 47 wherein said sinusoidal pattern comprises a sine pattern and a cosine pattern.

52. The position sensor of claim 51 wherein said sinusoidal pattern further comprises a positive sine pattern, a negative sine pattern, a positive cosine pattern, and a negative cosine pattern.

53. The position sensor of claim 47 wherein said sensing means further comprises at least one charge detecting means.

54. The position sensor of claim 47 wherein said sensing means further comprises at least one means for collecting charge.

55. The position sensor of claim 47 wherein said conducting means comprises a metal surface aligned with said sensing means.

56. The position sensor of claim 47 wherein said coupling means comprises a metal surface interrupted by a plurality of apertures.

57. The position sensor of claim 47 wherein said conducting means, said sensing means and said coupling means are separated by air gaps.

58. A position sensor comprising:
   (a) generating means for generating an AC signal;
   (b) sensing means defining a sinusoidal pattern for generating a sensing signal in response to receipt of at least a portion of said AC signal, said sensing means further comprising at least one charge detecting means and at least one charge collecting means;
   (c) conducting means for conducting said AC signal from said generating means to a position aligned with said sinusoidal pattern;
   (d) coupling means for coupling at least a portion of said AC signal from said conducting means to portions of said sinusoidal pattern depending on the position of said coupling means relative to said sinusoidal pattern, said coupling means comprising a surface interrupted by a plurality of apertures; and (e) moving means for moving said coupling means relative to said sensing means whereby the position of said coupling means relative to said sensing means can be determined from said sensing signal.

59. A method of sensing the position of a first member relative to a second member bearing a sinusoidal pattern of conductors, said method comprising:

(a) generating a fluctuating signal;

(b) moving the first member relative to the sinusoidal pattern in order to couple at least a portion of the fluctuating signal to a position of the sinusoidal pattern determined by the relative position of the first member and second member, said moving step comprising the step of coupling the signal through apertures to multiple equally spaced portions of the sinusoidal pattern; and (c) generating a sensing signal in response to receipt of the coupled signal by the sinusoidal pattern, whereby the position of the first member relative to the second member may be derived from the sensing signal.

60. The method of claim 59 wherein said fluctuating signal is an AC signal.

61. The method of claim 60 wherein said AC signal has a frequency of between about 1 megahertz and about 2 megahertz.

62. The method of claim 59 wherein said sinusoidal pattern comprises a sine pattern and a cosine pattern.

63. The method of claim 59 wherein said sinusoidal pattern further comprises a positive sine pattern, a negative sine pattern, a positive cosine pattern, and a negative cosine pattern.

64. The method of claim 59 wherein said moving step comprises the step of coupling the signal to multiple equally spaced portions of the sinusoidal pattern.

* * * * *